United States Patent
Rauhut et al.

[15] 3,671,450

[45] June 20, 1972

[54] CHEMILUMINESCENT COMPOSITIONS

[72] Inventors: Michael McKay Rauhut, Norwalk, Conn., Andrew Milo Semsel, Ridgefield, Conn.

[73] Assignee: American Cyanamid Company, Stamford, Conn.

[22] Filed: Sept. 22, 1969

[21] Appl. No.: 860,092

Related U.S. Application Data

[63] Continuation-in-part of Ser. No. 577,795, Sept. 7, 1966, abandoned.

[52] U.S. Cl. ..........................................252/186, 252/188.3
[51] Int. Cl. ................................................................C09k 3/00
[58] Field of Search ...........................252/188.3, 186, 301.2

[56] References Cited

UNITED STATES PATENTS 3,311,564  3/1967  Cline ................................252/188.3

OTHER PUBLICATIONS

Encyclopedia of Chemical Technology Second Ed. Vol. 4, p. 630 (1964).

Merck Index (1965) p. 512.

*Primary Examiner*—John D. Welsh
*Attorney*—Charles J. Fickey

[57] ABSTRACT

A novel composition and the process of producing the composition, whereby the composition is in the form of a gel having chemiluminescent properties. More particularly, the invention relates to the direct production of light from chemical energy employing any chemiluminescent compositions in the presence of a gelling agent. By "light" as referred to herein is meant electromagnetic radiation at wavelengths falling between about 350 m$\mu$ and 1,000 m$\mu$.

13 Claims, No Drawings

CHEMILUMINESCENT COMPOSITIONS

This application is a continuation-in-part of application Ser. No. 577,795, filed Sept. 7, 1966, now abandoned.

The present invention relates to a novel composition and the process of producing the composition, whereby the composition is in the form of a gel having chemiluminescent properties. More particularly, the invention relates to the direct production of light from chemical energy employing any chemiluminescent composition in the presence of a gelling agent. By "light" as referred to herein is meant electromagnetic radiation at wave lengths falling between about 350 m$\mu$ and about 1,000 m$\mu$.

Heretofore chemiluminescent materials have required the presence of a suitable container for the liquid state in which chemiluminescence occurs. The employment of a vessel has been necessary primarily to acquire the necessary geometric dimensions of the chemiluminescing liquid. As a chemiluminescent liquid becomes thinly spread, or shallow, its value as an efficient source of illumination is substantially lost. Also, in the absence of a container the chemiluminescing liquid would be quickly and substantially absorbed into the substrate surface (such as the ground) onto which it was poured, whereby any chemiluminescent light would not be visible thereafter. Additionally, the operativeness of many chemiluminescent systems depends upon the absence of contaminating impurities which serve as inhibitors and/or quenchers of the chemiluminescent light normally obtained by the particular process. When a liquid is placed on a random surface containing undetermined impurities, the degree of efficiency of chemiluminescence may be further retarded and/or blocked. In other words, a liquid chemiluminescent system employed outside of a clean vessel is vulnerable to contamination.

There are often situations in which materials are conveniently and/or optimally employed in a gelled form and in which the place of their employment would advantageously include at least a temporary source of light. One such typical instance is an explosive composition such as nitrocellulose which is poured or packed into bore holes or other darkened areas. Clearly in such situations, a source of light which is non-hazardous could be of benefit, for example, for purposes of determining the extent to which the hole has been drilled, or to determine distribution within the hole, etc. Similarly, explosives employing guar gum as a gelling agent advantageously could also include a source of non-hazardous light.

It is an object of this invention to obtain a gelled chemiluminescent reactant.

Another object of this invention is to obtain a process of producing chemiluminescent light by means of a gelled composition.

Another object is to obtain a gelled chemiluminescent explosive composition.

Another object is the process of obtaining a gelled chemiluminescent explosive composition.

Other objects will become apparent from the above and following disclosure.

The objects of this invention are obtained by admixing a chemiluminescent reactant, a gelling agent, and a suitable diluent, together with other ingredients necessary to obtain a chemiluminescent reaction, such as (1) including at least one fluorescent compound in the admixture, and (2) including at least one hydroperoxide or other appropriate peroxide compounds having the necessary peroxidic group, including such peroxidic compounds as hydrogen peroxide, and/or hydrogen peroxide-producing compounds.

The term "fluorescent compound," as used herein, means a compound which fluoresces in a chemiluminescent reaction, or a compound which produces a fluorescent compound in a chemiluminescent reaction.

The term "chemiluminescent composition," as used herein, means a mixture which will result in chemiluminescence.

The term "admixing," as used herein, means reacting or bringing together component reactants or ingredients sufficiently to obtain a chemiluminescent reaction.

The term "hydroperoxide compound" as used herein is limited to peroxide compounds having at least one "HOO—" group, or a compound which upon reaction produces a compound with such a group.

The term "peroxidic groups" as used herein represents "HOO—", "AOO—", or "BCOO". "A" and "B" are typically defined as a substituent such as alkyl, cycloalkyl, $\alpha$-hydroxyalkyl, substituted alkyl, for example, where "B" may additionally be aryl.

The term "diluent" as used herein means a solvent or a vehicle which when employed as a solvent does not cause insolubility.

The term "peroxide compound," as used herein, also includes compounds which upon reaction produce the peroxidic group.

The term "hydrogen peroxide compound" includes (1) hydrogen peroxide and (2) hydrogen peroxide-producing compounds.

It should be noted that the heart of the invention lies in the combining of any chemiluminescent system with a gelling agent whereby the gel material substantially retains the shape of its former container, or at least a three-dimensional configuration sufficiently to obtain effective chemiluminescent light yield and at least solidity sufficiently to avoid any substantial absorption into a substrate and/or absorption of contaminants from a substrate. Immediately after admixing the ingredients, depending upon the quantity in which the gelling agent is employed, the gel would normally properly begin chemiluminescing and concurrently begin to set up.

The utility of such a combination is virtually unlimited. It may be satisfactorily employed, for example, in areas which are not adapted to retain a liquid and/or in which other sources of illumination are not convenient and/or safe. For example, the chemiluminescent gel may be employed in and/or near explosives and/or inflammable materials and compositions. In areas where either a dependable and/or a continuous source of electric-power lighting is not available, or where other sources of lighting are either unavailable or are at least temporarily exhausted—such as in emergency situations, the chemiluminescent gel provides a reliable source of light without the complicating factors of the need of appropriate container-vessels, and without the problems of fragility and of potential contamination. The gel is readily adaptable for the night marking of a trail through a wooded or brush area, and for emergency signaling. It is adaptable to camping needs, outdoor party-lighting, etc.

The nature of the particular chemiluminescent material and the process of reacting that material to obtain chemiluminescent light is immaterial to this invention except to the extent that the particular chemiluminescent material and its system of producing chemiluminescent light is or might be inhibited or negated by a particular gelling agent. Obviously the invention does not contemplate employing a gelling agent which would make the chemiluminescence inoperative.

Similarly, the nature of the gelling agent is immaterial except to the extent that for a particular chemiluminescent reactant and its chemiluminescent system of producing chemiluminescent light, a gelling agent which would substantially inhibit or make inoperative the chemiluminescent system obviously would not be contemplated for that particular chemiluminescent system.

However, the nature of the chemiluminescent reactant and system may be such that although it will not perform satisfactorily with one gelling agent, it will nevertheless perform satisfactorily or in a superior manner with another gelling agent.

As noted above, the process of this invention offers several advantages over non-gelled solution-based chemiluminescence in the absence of an appropriate container.

Dimensional stability is one advantage, as follows. The brightness of a chemiluminescent reaction is dependent in part on the thickness of the system, the thick systems appearing brighter than thin systems. A gelled system will maintain its thickness when applied to a surface such as a table top while a liquid surface will spread out and become thinner and less bright. Impurities which are harmful to the chemiluminescent system, such as inhibitors and/or quenchers of the light-emitting process, cannot readily diffuse into a gel system while the liquid system is vulnerable to such contamination. As noted above, the presence of small amounts of impurities can have deleterious effects on chemiluminescent systems and is the probable explanation for difference in the results of chemiluminescent studies by various workers in the field. The effect of the addition of a foreign material which does not participate in the chemiluminescent reaction might normally be expected to inhibit, quench, make inoperative, or at least in some manner or degree have an adverse effect on a chemiluminescent reaction. For example see Journal of Organic Chemistry, Vol. 3, p. 385 (1938) an article by Fred H. Strauss and Gerald E. D. Branch, "Berichte der Deutschen Chemischen Gesellschaft," Vol. 75B, p. 565 (1942), an article by Karl N. Weber. However, we have unexpectedly discovered that the addition of a foreign-material gelling agent broadly is not harmful to chemiluminescent reactions when added thereto and admixed therewith.

While the process of producing the gels of this invention is well known, any conventional gel being within the scope of this invention, the process of admixing such gels with chemiluminescent materials and of composition containing both materials is novel.

A gelling agent, as the term is used herein, is a material which, when added to a liquid in proper concentration and at proper pH, will cause that liquid to become a solid or semisolid gel. Examples of such gelling materials are alkali and alkaline earth metal soaps; bentonite; polyaryl ureas; silica; saccharides; indanthrene blue (less desirable because of intense color); natural plant hydrocolloids such as guar, tragacanth, algin and the pectins; starches and starch derivatives; cellulose and synthetic cellulose derivatives such as nitrocellulose; polyvinyl compounds such as polyvinyl alcohol, polyvinyl pyrrolidone, polyacrylates, and ethylene oxide polymers; hevea latex.

It should be noted that the ordinary artisan may make appropriate adjustment in the concentration of the various ingredients as well as the pH of the ingredients, depending upon the particular chemiluminescent system employed, and depending upon the particular gelling agent employed as well as depending upon the particular results desired. For example, some chemiluminescent systems require a neutral or about neutral pH, while others perform more satisfactorily in alkaline media as contrasted to others which perform comparably better in an acid media. Similarly, with some gels as in the case of silica, the higher the pH is, the greater the stiffness of the gel becomes. As another typical example, consider the polyacrylates which must have a pH of about neutral or an alkaline pH and which do not perform as satisfactorily at lower pH, i.e. at about acid pH's. If an acid pH was employed or necessary while concurrently employing polyacrylate, a greater concentration of the gelling agent would be necessary to obtain an equivalent degree of gel solidity.

Typical chemiluminescent materials and their respective systems within the scope of this invention include materials which produce light upon reaction with necessary reactants in an appropriate solvent medium. Typical examples of such materials and systems are: 3-aminophthalhydrazide (examples 4, 5, 6, 7, 9) (luminol) with potassium persulfate and hydrogen peroxide or with oxygen and a strong base; biacridinium salts (lucigenin) in aqueous ammonia with hydrogen peroxide; derivatives of oxalic acid (examples 1, 2, 3, 10) including oxalyl halide, oxalic esters, anhydrides of oxalic acid and the like with hydrogen peroxide and a fluorescent material or with tertiary butyl hydroperoxide and a fluorescer; tetracyano ethylene with hydrogen peroxide and a fluorescent material; 9-chlorocarbonyl-10-methylacridinium chloride (rosigenin) or its derivatives with hydrogen peroxide. The process of this invention is not limited to the above mentioned materials and systems. The process of this invention will apply to any chemiluminescent materials which are capable of emitting light while in solution.

Chemiluminescent materials are capable of performing in a variety of solvents and the process of this invention is applicable to those solvents. However, the optimal solvent will vary depending upon the particular chemiluminescent system employed, and also depending upon the particular gelling agent employed. Examples of solvents in which chemiluminescent reactions take place are: ethers such as tetrahydrofuran, diethyl ether, and 1,2-dimethoxyethane; esters such as dimethyl phthalate, diethyl adipate, triethyl phosphate, and ethyl acetate; halocarbons such as chloroform; dimethylformamide; dimethyl sulfoxide; alcohols such as tertiary butanol; pyridine; methyl pyrrollidone and others.

As noted above, many possible combinations of solvent, chemiluminescent material, and gelling agent exist. It is within ordinary skill to match the chemiluminescent systems to obtain the combinations which will be suitable for the process of this invention. Copper phthalocyanine, for example, will catalyze the decomposition of peroxides which are essential ingredients in some chemiluminescent systems and is therefore normally unsuited for gelling such systems. Carbon black gels would normally be too opaque to permit efficient light emission for most chemiluminescent systems, if an efficient system is required.

The concentration of the diluent employed in this invention is material to the invention only to the extent that the greater the amount of diluent to be employed, the greater the amount of gelling agent that will be needed to gel the composition and also the greater the amount of chemiluminescent reactants that will be normally necessary to obtain a correspondingly bright emission of light.

The ingredients of the composition of this invention may be admixed in a single stage of admixing, or in a sequence of steps of admixing the separate ingredients. Accordingly, alternative compositions may be prepared which may be stored over a period of time and which may be admixed with the final necessary ingredient at a time when the chemiluminescent light is desired. When employing a chemiluminescent system and a gelling agent which both respectively are non-liquid, all other necessary dry reactants for obtaining a chemiluminescent reaction may be included in the composition. Upon subsequent addition of a diluent, such as water (if in fact water is an appropriate diluent (a) for the particular chemiluminescent reactants employed, and (b) for the particular gelling agent employed), the chemiluminescent reaction occurs and setting up begins to provide a light-emitting gel. Alternatively, for example, a diluent and substantially all necessary ingredients might in some cases be employed, with the exception of one or more necessary ingredients such as an appropriate peroxide or hydroperoxide compound. The preferred composition would be less than all necessary components to produce a chemiluminescent light, unless all ingredients were simultaneously being mixed at the point of use. For convenience, it would be desirable to have all necessary ingredients present with the exception of a final additive necessary to obtain chemiluminescent light; naturally the final additive might contain more than one ingredient.

The wavelength of the light emitted by chemiluminescence of the compound of this invention, i.e., the color of the light emitted, may be varied by the addition of any one or more energy transfer agents (fluorescers) such as known fluorescent compounds or any compound equivalent thereto.

The wavelength of light emitted by the composition of this invention will vary, depending upon the particular fluorescent components employed in the reaction. Similarly, the intensity of light obtained by the composition in the process of this invention will vary depending upon the degree to which a gelling agent makes the mixture more or less opaque.

The temperature of reaction of ingredients is dependent upon the particular chemiluminescent system employed and the ordinary artisan may select the desirable combination most appropriate to the conditions to be encountered at the point of use.

As is the case with other chemiluminescent systems and as in part discussed above, factors which influence the intensity of chemiluminescent light include, for example, pH, the particular hydroperoxide or peroxide employed, the nature of the diluent and amount thereof, and the employment of a catalyst which changes the rate of reaction. Any one or more of these factors may be adjusted as a means of regulating the degree and rate of reaction for any particular situation that might be desired at the point of use.

The following examples are intended to illustrate the present invention and are in no way intended to limit the invention except as limited in the appended claims.

EXAMPLE I

Finely divided silica (1.3 g) is added to 10.6 g of a chemiluminescent reaction consisting of $1.0 \times 10^{-2}$ M bis(3-trifluoromethyl-4-nitro phenyl) oxalate, $1.0 \times 10^{-1}$ M hydrogen peroxide, and $5.0 \times 10^{-4}$ M 9,10-diphenylanthracene in triethyl phosphate with vigorous stirring. A firm illuminescing chemiluminescent gel is produced.

EXAMPLE II

This reaction is similar to example I except that it comprises 8.8 g of a chemiluminescent reaction composed of $5.0 \times 10^{-3}$ M bis(2,4-dinitro-6-methyl-phenyl)oxalate, $1.0 \times 10^{-2}$ M hydrogen peroxide, and $5.0 \times 10^{-4}$ M of 9,10-diphenylanthracene in methyl ethyl ketone and 0.5 g of finely divided silica. A firm illuminescing chemiluminescent gel is produced.

EXAMPLE III

A firm illuminescing chemiluminescent gel is produced by adding 0.8 g of fine divided silica to 11.5 g of a chemiluminescent reaction comprised of $1.0 \times 10^{-2}$ M of bis(2-hydroxypyridine)oxalate, $5.0 \times 10^{-2}$ M hydrogen peroxide, and $5.0 \times 10^{-4}$ M 9,10-diphenyl anthracene in dimethyl phthalate.

EXAMPLE IV

A soft gel of 1.8 g of finely divided silica and 12.3 g of $2.0 \times 10^{-3}$ M 3-aminophthalhydrazide, $5.0 \times 10^{-1}$ M hydrogenperoxide, and $3.0 \times 10^{-5}$ M fluorescein in dimethyl sulfoxide is prepared. The addition of 50% aqueous KOH to give a $1.0 \times 10^{-1}$ M solution results in a hard chemiluminescent gel.

EXAMPLE V

To 9.9 g of a solution of $2.0 \times 10^{-2}$ M 3-amino-phthalhydrazide, $5.0 \times 10^{-1}$ M hydrogen peroxide, and $3.0 \times 10^{-5}$ M fluorescein in dimethylformamide is added 1.1 g of aluminum distearate with vigorous stirring, resulting in a soft gel. The addition of 50% KOH to give a base concentration of $1.0 \times 10^{-1}$ M produces a stiffer gel which emits yellow chemiluminescent light. Note that the alkaline material (KOH) (1) initiated the chemiluminescent reaction as well as (2) increased the firmness of the gel.

EXAMPLE VI

A solution of 6.3 g of potassium persulfate in 100 ml of water is stirred on a high shear stirrer with 2.0 g of polyacrylic acid to yield a viscous solution. A second solution consisting of 0.4 g of sodium 3-aminophthal-hydrazide 0.12 g of disodium fluorescein, and 2.3 g of sodium perborate tetrahydrate in 100 ml of water is stirred on a high shear stirrer with 2.0 g of polyacrylic acid to yield a soft yellow gel. To obtain chemiluminescent light, (1) the first solution is added to the second and (2) promptly thereafter a solution of 1.7 g of potassium carbonate in 50 ml of water is poured into the combined gels to yield a clear yellow-light-emitting chemiluminescent gel of a slightly stiffer consistency than well-whipped cream.

EXAMPLE VII

A viscous solution of 1.0 g of guar gum in 50 ml of water is added to 50 ml of a chemiluminescent solution consisting of $2.0 \times 10^{-2}$ M 3-aminophthalhydrazide, $2.0 \times 10^{-1}$ M sodium hydroxide, $6.0 \times 10^{-2}$ M ammonium persulfate and $5.0 \times 10^{-2}$ M sodium perborate in 50 ml of water. A loose gel with a blue chemiluminescence is produced.

EXAMPLE VIII

A high shear stirrer is used to produce a soft gel from 3.0 g of polyacrylic acid and 100 g of a solution of $1.0 \times 10^{-2}$ M 9-chlorocarbonyl acridinium chloride, and $1.0 \times 10^{-1}$ M hydrogen peroxide in water. The addition of 50 percent aqueous potassium hydroxide to give a solution $1.0 \times 10^{-1}$ M in KOH also produces a firm light-emitting chemiluminescent gel. The light is at first yellow, then green, and finally blue.

EXAMPLE IX

As a typical example, the following two solutions were prepared:

Solution I: A 20 ml of 28 percent aqueous water glass was dissolved in 30 ml of an aqueous solution that was 0.1 molar in 3-aminophthalhydrazide and 1.0 molar in sodium hydroxide, and 4 ml of 90 percent hydrogen peroxide was added.

Solution II: A 2.5 g of sodium aluminate was dissolved in 50 ml of water containing 0.01 to 0.1 grams of hemin.

A 25 ml of solution I was diluted with 25 ml of water and poured into solution II. A rigid gel formed within several seconds; the gel emitted a bright, long-lasting green-blue light. When 0.01 g of fluorescein is added to either solution I or II prior to mixing, the color of the emitted light is changed to yellow and the apparent intensity is increased. Thus, color of the light was varied by the addition of an energy-transfer agent.

EXAMPLE X

Finely divided silica (0.5 g) (gelling agent) is added to 7.5 g of a vigorously stirred chemiluminescing solution of $1.0 \times 10^{-2}$ M bis(2,4-dinitrophenyl)oxalate, $1.0 \times 10^{-1}$ M hydrogen peroxide, an $5.0 \times 10^{-4}$ M rubrene in dimethyl phthalate. A soft chemiluminescent gel is formed.

The above examples I through X are illustrated in table I.

It is within the scope of this invention to make such modifications of the compositions and processes disclosed herein as would be obvious for a person of ordinary skill in this art, and it is to be understood that the examples illustrating this invention are intended to limit the invention only to the extent that is stated in the specification and only to the extent that the claims are limited. Also, it is within the scope of this invention to form an apparatus or article such as a container which, for example, may be either a substantially insoluble or alternatively a dissolvable capsule in which the composition of this invention is substantially enclosed for or prior to subsequent reaction with other ingredients necessary to produce chemiluminescent light.

TABLE I

[Ingredient and appropriate concentration thereof]

| Example number | Chemiluminescent material | Oxidant | Fl | Solvent | Gelling agent | Base |
|---|---|---|---|---|---|---|
| I | 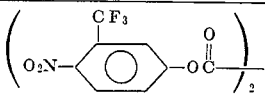 | $H_2O_2$, $1.0 \times 10^{-1}$ M | DPA, $5.0 \times 10^{-4}$ M | TEP | Silica, 11% | |

Table I—Continued

| Example number | Chemiluminescent material | Oxidant | Fl | Solvent | Gelling agent | Base |
|---|---|---|---|---|---|---|
| II | [dinitro-methyl-phenyl carbonate structure], $5.0 \times 10^{-5}$ M | $H_2O_2$, $1.0 \times 10^{-2}$ M | DPA, $5.0 \times 10^{-4}$ M | MEK | Silica, 5.9% | |
| III | [bis(pyridyl carbonate) structure], $1.0 \times 10^{-2}$ M | $H_2O_2$, $5.0 \times 10^{-2}$ M | DPA, $5.0 \times 10^{-4}$ M | DMP | Silica, 6.5% | |
| IV | [aminophthalhydrazide structure], $2.0 \times 10^{-3}$ M | $H_2O_2$, $5.0 \times 10^{-1}$ M | Fluorescein, $3.0 \times 10^{-5}$ M | DMSO | Silica, 14.7% | KOH, $1.0 \times 10^{-1}$ M |
| V | [aminophthalhydrazide structure], $2.0 \times 10^{-3}$ M | $H_2O_2$, $5.0 \times 10^{-3}$ M | Fluorescein, $3.0 \times 10^{-5}$ M | DMF | Aluminum stearate, 10% | KOH, $1.0 \times 10^{-1}$ M |
| VI | [aminophthalhydrazide structure], $2.0 \times 10^{-3}$ M | $K_2S_2O_8$, $6.0 \times 10^{-2}$ M; $H_2O_2$, $3.0 \times 10^{-2}$ M | Fluorescein, $2.0 \times 10^{-3}$ M | $H_2O$ | Polyacrylic acid, 2% | $K_2CO_3$, $1.0 \times 10^{-4}$ M |
| VII | [aminophthalhydrazide structure], $1.0 \times 10^{-2}$ M | $(NH_4)_2S_2O_8$, $3.0 \times 10^{-1}$ M; $NaBO_3$, $2.5 \times 10^{-2}$ M | | $H_2O$ | Guar gum, 1% | NaOH $2.0 \times 10^{-1}$ M |
| VIII | [acridinium chloride structure], $1.0 \times 10^{-2}$ M | $H_2O_2$, $1.0 \times 10^{-1}$ M | | $H_2O$ | Carbopol, 3% | KOH $1.0 \times 10^{-1}$ M |
| IX | [aminophthalhydrazide structure], $5.0 \times 10^{-3}$ M | $H_2S_2O_8$, $6.0 \times 10^{-2}$ M; $H_2O_2$, $3.0 \times 10^{-2}$ M | Fluorescein, $2.0 \times 10^{-4}$ M | $H_2O$ | Waterglass, 7% | NaOH $5.0 \times 10^{-3}$ M |
| X | [bis(nitrophenyl) oxalate structure], $1.0 \times 10^{-2}$ M | $H_2O_2$, $1.0 \times 10^{-1}$ M | Rubrene, $5.0 \times 10^{-4}$ M | DMP | Silica, 6.2% | |

We claim:

1. A composition of matter in gel form, said composition emitting visible light in said form, said composition having the ingredients, a chemiluminescent compound and an oxidizing agent, therefor, an organic solvent, an organic fluorescent compound, and a gelling agent, said oxidizing agent being capable of reacting with said chemiluminescent compound in said solvent to cause emission of light by said fluorescer, said fluorescer being present as a fluorescent moiety of said chemiluminescent compound or as a separate organic fluorescent compound.

2. A composition according to claim 1 in which said gelling agent is selected from the group consisting of alkali metal soaps, alkaline earth metal soaps, bentonite, polyaryl ureas, silica, calcium carbonate, saccharides, indanthrene blue, natural plant hydrocolloids, starches, starch derivatives, cellulose, synthetic cellulose derivatives, polyvinyl compounds, and hevea latex.

3. A composition according to claim 2 in which said natural plant hydrocolloids are selected from the group consisting of guar, tragacanth, algin, and pectin, in which said synthetic cellulose comprises nitrocellulose, and in which said polyvinyl compounds are selected from the group consisting of polyvinyl alcohol, polyvinyl pyrrolidone, polyacrylate, and ethylene oxide polymer.

4. A composition according to claim 1 in which said gelling agent is silica.

5. A composition according to claim 1 in which said gelling agent is nitrocellulose.

6. A composition according to claim 1 in which said chemiluminescent reactant is 3-aminophthalhydrazide.

7. A composition according to claim 1 in which said chemiluminescent reactant is a derivative of oxalic acid.

8. A chemiluminescent composition according to claim 7 in which said gelling agent is silica ranging from about 1 percent to about 20 percent on the basis of total weight of said gel.

9. A process for obtaining a light-emitting gel comprising reacting together a chemiluminescent reactant, a gelling agent, a fluorescer, an oxidizing agent and an organic solvent said fluorescer being present as a moiety of said chemiluminescent reactant or as a separate organic fluorescent compound, each ingredient being present in amounts sufficient (1) to obtain chemiluminescence and (2) to obtain the gel.

10. A process according to claim 9 in which said gelling agent is nitrocellulose in amounts sufficient to form an explosive composition.

11. A chemiluminescent composition comprising luminol, a solvent, an oxidizing agent and silica.

12. A composition according to claim 1 in which said chemiluminescent reactant is an electronegatively-substituted aryl oxalic ester and containing a separate fluorescent compound.

13. A composition according to claim 12 in which said gelling agent is silica.

* * * * *